April 21, 1925.

A. B. SMITH 1,534,549

SWITCH CONTROL CIRCUIT FOR AUTOMATIC TELEPHONE SYSTEMS

Original Filed Sept. 19, 1919

Inventor
Arthur Bessey Smith
Chas. L. Candy Atty.

Patented Apr. 21, 1925.

1,534,549

UNITED STATES PATENT OFFICE.

ARTHUR BESSEY SMITH, OF EVANSTON, ILLINOIS, ASSIGNOR TO AUTOMATIC ELECTRIC COMPANY, OF CHICAGO, ILLINOIS, A CORPORATION OF ILLINOIS.

SWITCH CONTROL CIRCUIT FOR AUTOMATIC TELEPHONE SYSTEMS.

Original application filed September 19, 1919, Serial No. 324,997. Divided and this application filed November 29, 1922. Serial No. 603,934.

*To all whom it may concern:*

Be it known that I, ARTHUR BESSEY SMITH, a citizen of the United States of America, and a resident of Evanston, Cook County, and State of Illinois, have invented certain new and useful Improvements in Switch Control Circuits for Automatic Telephone Systems, of which the following is a specification.

My invention relates in general to control circuits for automatic switches, but more particularly to such circuits as extend over long aerial lines, or which include a section of cable, and which therefore have considerable electrostatic capacity; and the object of the invention is to provide an improved circuit arrangement wherein the effect of line capacity is neutralized, thereby permitting automatic switches to be controlled accurately and certainly.

Figure 1:
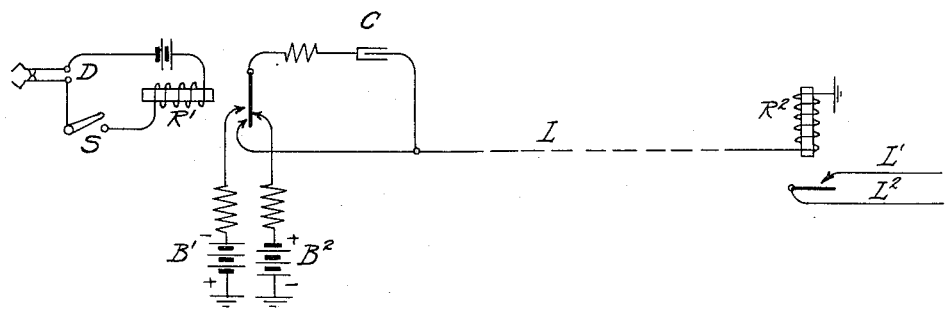
Figure 6:
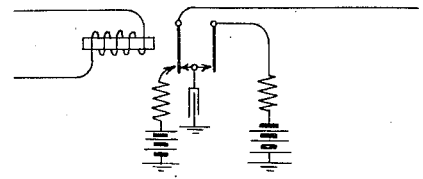
Figure 7:
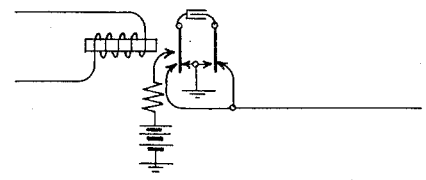

I have shown in Fig. 1 of the drawings that embodiment of the invention which I consider to be the best; and in Figs. 2 to 7, inclusive, I have shown certain modifications of the invention which produce the desired results more or less perfectly in somewhat different ways. The modifications shown in Figs. 6 and 7 are claimed herein, while the embodiment shown in Fig. 1 is claimed in my application Serial No. 324,997, filed September 19, 1919, of which this application is a division.

Referring to Fig. 1, the reference character L indicates a line of high electrostatic capacity, and which may be a so called simplex circuit superimposed on a toll or long distance line. R' is a relay adapted to be energized by the closure of the switch S and which may thereafter be intermittently deenergized by operation of the calling device D to produce a series of interruptions in the circuit of the line L. This circuit includes at the opposite end of the line the relay R² which responds upon the initial closure of the line circuit to complete a switch control circuit over conductors L' and L², and which deenergizes thereafter responsive to interruptions in the line circuit to reproduce such interruptions in the switch control circuit.

Circuits corresponding to those described above are well known in the art. Relay R' may be a relay of a repeater located in a particular exchange, which repeater is accessible to calling subscribers for enabling them to establish connections over the toll line with which the repeater is associated; while relay R² may be a relay of another repeater at the opposite end of the toll line, whose function it is to control one or more automatic switches to complete such connections to the desired called lines, all of which is well understood, as previously stated.

I will now proceed to explain the operation of my invention. Referring to Fig. 1, and neglecting for a moment the condenser C and battery B², or rather, assuming that they are not present, it will be seen that when relay R' is energized, the negative pole of grounded battery B' is connected to line L, thereby causing a current flow over the said line and resulting in the energization of relay R² at the distant end. At the same time, the line conductor may be said to become charged negatively by reason of its electrostatic capacity with regard to the earth. Now when relay R' is momentarily deenergized to interrupt the circuit, current flow from the battery will cease and relay R² should instantly deenergize. However, still assuming the absence of condenser C and battery B², it does not do this, but remains energized for an instant after its circuit is broken thereby prolonging obviously its periods of energization and diminishing its periods of deenergization, to the great detriment of the controlling impulses transmitted over the circuit. This faulty operation is due to the charge on the line, which at each interruption of the circuit flows off through the relay R² to ground and thus holds the said relay energized for an instant after each interruption, or more generally speaking, renders it sluggish in responding to interruptions of the circuit.

Consider now the effect of condenser C and battery B² connected as shown in Fig. 1. While relay R' is energized the condenser is short-circuited and therefore completely discharged. Now when the relay R' deenergizes and interrupts the line circuit, the condenser is connected from the line to the positive pole of grounded battery B², from which it will appear that the negative charge on the line will flow into the condenser, in a manner of speaking, and charge it, this action being assisted by the fact that the opposite side of the condenser is connected to the positive pole of the grounded battery, instead of direct to ground. It will thus be seen that the condenser affords a means for dissipating the line charge, whereby a large portion of it is prevented from flowing thru the relay R² to ground. Relay R² becomes much more quickly responsive to interruptions in its circuit and the process of transmitting switch controlling impulses is rendered certain and dependable.

Figure 2:
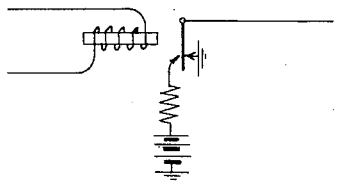
Figure 5:
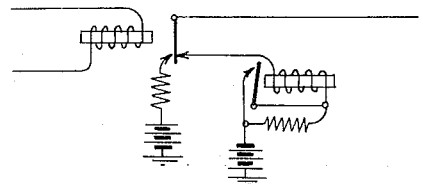
Figure 3:
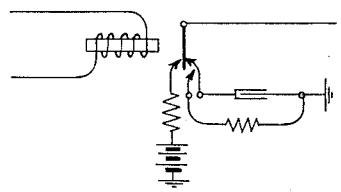
Figure 4:
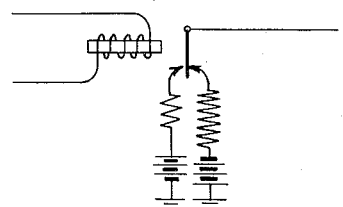

Taking up the modifications now, these will be easily understood without extended explanation. Fig. 2 shows means for directly grounding the line circuit between interruptions, which is found to be helpful in certain cases. The arrangement shown in Fig. 3 resembles that shown in Fig. 1 in that a condenser is used which is short-circuited while the line circuit is closed and which is connected from the line to ground during interruptions. No battery is used however, in connection with the condenser. In Fig. 4 a battery of reversed polarity operates directly without the interposition of a condenser to take care of the line charge. With this arrangement a rather high resistance must be used to prevent the reverse current flow from rising to too high a value before the end of the interruption of the line circuit. An improvement on this idea, Fig. 5, uses a relay of low resistance which on operating inserts a high resistance in series with its own winding to limit the current flow. Fig. 6 may be considered an improvement on Fig. 3. A condenser is connected from the line to ground during interruptions of the line circuit, as in Fig. 3; but when the line circuit is closed the condenser is oppositely charged instead of merely being short-circuited. The condenser therefore, need only be half as large. The last modification, Fig. 7 uses a condenser oppositely charged but dispenses with the extra battery, the circuit arrangement being such that during closures of the line circuit the condenser is oppositely charged by the main battery.

Other modifications than those pointed out above will doubtless occur to persons skilled in the art; and the invention will no doubt be found to be of utility under circumstances differing from those specifically mentioned. I do not, therefore, wish to be held to the exact form of the invention disclosed herein, but desire to include and have protected by Letters Patent all variations thereof which come within the scope of the appended claims:

What I claim as my invention is:

1. In combination, a line circuit, a relay and a battery in said circuit, the line being charged while the circuit is closed, a relay having contacts for intermittently interrupting said circuit, contacts on said second relay for closing a shunt path for discharge currents around said first relay every time the said circuit is interrupted, a condenser in said shunt path, a discharge circuit including a second battery for discharging said condenser while the line circuit is closed, and contacts on said second relay for closing said discharge circuit.

2. In combination, a ground return line circuit having a relay included at one end and a battery at the other, said line having high electrostatic capacity, means for intermittently interrupting the line circuit to operate said relay, a condenser, a circuit for connecting said condenser to discharge the line each time the line circuit is interrupted, a circuit including a second battery with suitable connections thereto for discharging said condenser each time the line circuit is closed, and a relay having only five contact springs for directly controlling all said circuits as set forth.

3. In combination, a ground return line circuit having a relay at one end, a battery at the other end having one pole grounded, a second relay and means for energizing it, contacts on said second relay for closing the line circuit through said first battery to operate said relay, means for intermittently deenergizing said second relay to interrupt the circuit to produce deenergizations of said first relay, a condenser, contacts on said second relay for connecting the line to ground through said condenser to discharge the line each time the circuit is interrupted, and a circuit including contacts on said second relay for discharging said condenser and for charging it in the opposite direction each time the line circuit is closed.

In witness whereof, I hereunto subscribe my name this 27th day of November A. D., 1922.

ARTHUR BESSEY SMITH.